US010827038B2

(12) United States Patent
Yan et al.

(10) Patent No.: US 10,827,038 B2
(45) Date of Patent: *Nov. 3, 2020

(54) APPLICATION FOOTPRINT RECORDER AND SYNCHRONIZER

(71) Applicant: SuccessFactors, Inc., South San Francisco, CA (US)

(72) Inventors: Xiao Zhi Yan, Shanghai (CN); Sally Weng, Shanghai (CN); Peter Zhao, Shanghai (CN)

(73) Assignee: SuccessFactors, Inc., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/393,754

(22) Filed: Apr. 24, 2019

(65) Prior Publication Data

US 2019/0253526 A1 Aug. 15, 2019

Related U.S. Application Data

(63) Continuation of application No. 14/953,961, filed on Nov. 30, 2015, now Pat. No. 10,320,948.

(51) Int. Cl.
H04L 29/06 (2006.01)
H04L 29/08 (2006.01)

(52) U.S. Cl.
CPC ............ H04L 67/42 (2013.01); H04L 67/142 (2013.01); H04L 67/306 (2013.01)

(58) Field of Classification Search
CPC ...... H04L 67/42; H04L 67/142; H04L 67/306
See application file for complete search history.

(56) References Cited

U.S. PATENT DOCUMENTS 6,418,471 B1 7/2002 Shelton et al.
7,043,546 B2 5/2006 Smith et al.
(Continued)

FOREIGN PATENT DOCUMENTS

CA 2420394 C 5/2010
EP 1377907 A2 1/2004
(Continued)

OTHER PUBLICATIONS

"U.S. Appl. No. 14/953,961, Examiner Interview Summary dated Feb. 27, 2018", 3 pgs.
(Continued)

Primary Examiner — John M Macilwinen
(74) Attorney, Agent, or Firm — Schwegman Lundberg & Woessner, P.A.

(57) ABSTRACT

Systems and methods for receiving, at a server computer, an indication that a user is exiting an application on a client device displaying a first document, causing a footprint of the first document to be stored, receiving, at the server computer, a request for a second document from the client device operated by the user, determining that the user is enrolled in a footprint services, retrieving a footprint associated with the user including information related to a document previously accessed by the user, causing information related to the footprint to be displayed to the user on the client device, receiving, from the client device operated by the user, a response to the information related to the footprint displayed to the user on the client device, determining, from the response, a request to display the document associated with the footprint, and causing the document associated with the footprint to be displayed to the user instead of the second document requested by the user.

20 Claims, 8 Drawing Sheets

(56) References Cited

U.S. PATENT DOCUMENTS

| | | |
|---|---|---|
| 7,305,562 B1 | 12/2007 | Bianco et al. |
| 7,899,915 B2 | 3/2011 | Reisman |
| 7,953,719 B2 | 5/2011 | Straut |
| 8,499,041 B2 | 7/2013 | Fiedorowicz et al. |
| 8,510,282 B2 | 8/2013 | Murali |
| 2001/0039546 A1 | 11/2001 | Moore et al. |
| 2003/0110266 A1 | 6/2003 | Rollins et al. |
| 2004/0100507 A1 | 5/2004 | Hayner et al. |
| 2004/0193699 A1 | 9/2004 | Heymann et al. |
| 2006/0089987 A1 | 4/2006 | Igarashi et al. |
| 2009/0313304 A1 | 12/2009 | Goodger et al. |
| 2013/0073463 A1 | 3/2013 | Dimmick et al. |
| 2013/0110565 A1 | 5/2013 | Means, Jr. et al. |
| 2013/0254685 A1* | 9/2013 | Batraski ............... G06F 16/955 715/760 |
| 2014/0089472 A1 | 3/2014 | Tessler |
| 2014/0122715 A1 | 5/2014 | Rowe |
| 2014/0149586 A1 | 5/2014 | Clapp et al. |
| 2014/0279130 A1 | 9/2014 | Lau et al. |
| 2015/0039982 A1 | 2/2015 | Bastide et al. |
| 2015/0081381 A1 | 3/2015 | Okoba |
| 2016/0173617 A1* | 6/2016 | Allinson ............... H04L 67/02 709/227 |
| 2017/0155714 A1 | 6/2017 | Yan et al. |

FOREIGN PATENT DOCUMENTS

| | | |
|---|---|---|
| WO | WO-2001084432 A1 | 11/2001 |
| WO | WO-2001086503 A2 | 11/2001 |
| WO | WO-20020170165 A2 | 2/2002 |
| WO | WO-2009151637 A1 | 12/2009 |
| WO | WO-2012148934 A1 | 11/2012 |

OTHER PUBLICATIONS

"U.S. Appl. No. 14/953,961, Examiner Interview Summary dated Jun. 20, 2018", 3 pgs.

"U.S. Appl. No. 14/953,961, Examiner Interview Summary dated Nov. 6, 2018", 3 pgs.

"U.S. Appl. No. 14/953,961, Final Office Action dated Feb. 2, 2018", 14 pgs.

"U.S. Appl. No. 14/953,961, Final Office Action dated Sep. 14, 2018", 16 pgs.

"U.S. Appl. No. 14/953,961, Non Final Office Action dated Apr. 9, 2018", 9 pgs.

"U.S. Appl. No. 14/953,961, Non Final Office Action dated Sep. 7, 2017", 12 pgs.

"U.S. Appl. No. 14/953,961, Notice of Allowance dated Feb. 20, 2019", 7 pgs.

"U.S. Appl. No. 14/953,961, Response Filed Mar. 7, 2018 to Final Office Action dated Feb. 2, 2018", 11 pgs.

"U.S. Appl. No. 14/953,961, Response filed Jun. 27, 2018 to Non Final Office Action dated Apr. 9, 2018", 14 pgs.

"U.S. Appl. No. 14/953,961, Response filed Nov. 2, 2018 to Final Office Action dated Sep. 14, 2018", 15 pgs.

"U.S. Appl. No. 14/953,961, Response filed Nov. 20, 2017 to Non Final Office ACtion dated Sep. 7, 2017", 12 pgs.

\* cited by examiner

APPLICATION FOOTPRINT RECORDER AND SYNCHRONIZER

CROSS-REFERENCE TO RELATED APPLICATIONS

This application is a continuation of prior application Ser. No. 14/953,961, filed on Nov. 30, 2015, which is incorporated by reference herein in its entirety.

TECHNICAL FIELD

The present disclosure relates generally to a mechanism for recording and synchronizing application footprints.

BACKGROUND

A user may utilize an application on a device to access documents such as various webpages associated with websites on the Internet. After exiting the application there is no easy way for a user to return to the same document at a later time, especially if the user is using a different application or device.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to recording and synchronizing application footprints. For example, the system described herein may record an application footprint, save the footprint to a server, and then when a user accesses the application again to request a new document, the footprint will get synchronized from the footprint server to the application automatically. The user can then choose to jump to the document associated with the footprint or continue on to the new document. The synchronization may occur across different types of devices and across different types of platforms.

Figure 1:
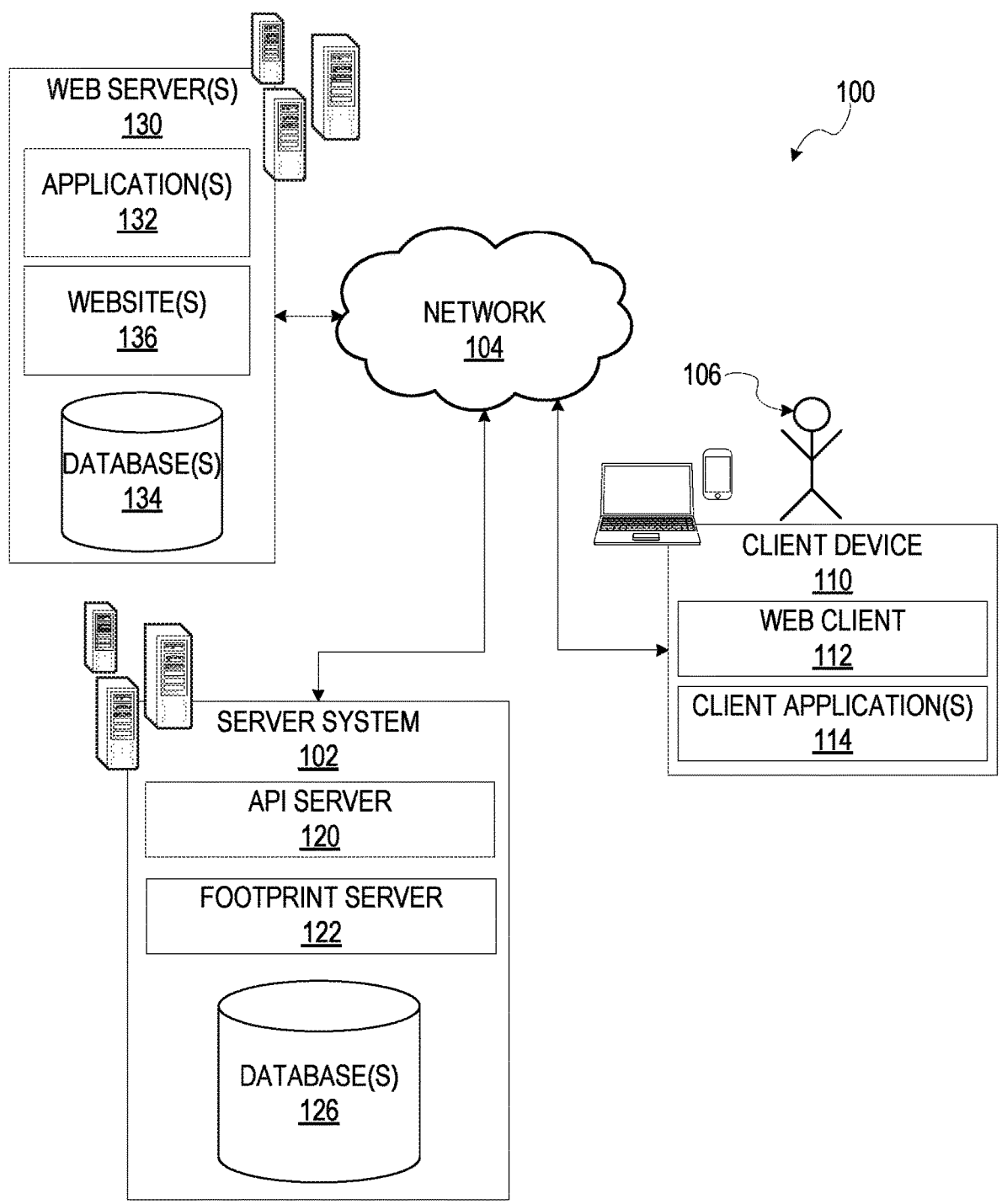
FIG. 1 is a block diagram illustrating a networked system, according to some example embodiments, to record and synchronize application footprints.

FIG. 1 is a block diagram illustrating a networked system 100, according to some example embodiments, configured to record and synchronize application footprints. The system 100 may include one or more client devices such as client device 110. The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, computers in vehicles, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user 106 that is used to search and display various information, such as information on the Internet via an application such as a web browser, etc. In one embodiment, the system 100 is an application (e.g., web browser) footprint recorder and synchronizer that allows a user 106 to enroll in footprint services to restore the user to a previous document (e.g., webpage) that he was viewing before he logged off the website or closed the application. A user 106 may use more than one device 110 or more than one type of device 110 to access an application and document, in some example embodiments. A user may use more than one client application 114 on the one or more client devices 110, in some example embodiments.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., third party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more applications 114 (also referred to as "apps") such as, but not limited to, a web browser, messaging application, electronic mail (email) application, an e-commerce site application, a mapping or location application, a news or media application, and the like. In some embodiments, one or more applications 114 may be included in a given one of the client device 110, and configured to locally provide the user interface and at least some of the functionalities with the application 114 configured to communicate with other entities in the system 100 (e.g., web servers 130, server system 102, etc.), on an as needed basis, for data and/or processing capabilities not locally available (e.g., access to various information, to authenticate a user 106, to verify a method of payment, to retrieve/synchronize footprints, etc.). Conversely, one or more applications 114 may not be included in the client device 110, and then the client device 110 may use its web browser to access the one or more applications hosted on other entities in the system 100 (e.g., web servers 130, server system 102, etc.).

A server system 102 may provide server-side functionality via the network 104 (e.g., the Internet or wide area network (WAN)) to one or more web servers 130 and/or one or more client devices 110. The server system 102 may include an application program interface (API) server 120, and a footprint server 122, that may be communicatively coupled with one or more database(s) 126. The database(s) 126 may be storage devices that store information such as information associated with users of the system 100, information related to application footprints, etc.

The footprint server 122 may provide functionality to receive footprint information, user information, etc., and to store such information in one or more database(s) 126. The footprint server 122 may further provide functionality to receive requests for user and/or footprint information, and send information related to users and footprint information to other entities such as web server(s) 130 or client devices 110. The footprint server 122 may access one or more database(s) 126 to retrieve stored data and to store such data. Footprint information may include information to identify at least the last document viewed by the user (e.g., URL, title, summary, etc.). Footprint information may also include information associated with the user (e.g., user name, password, PIN, address, phone number, IP address, device identifier, etc.). A document may include a hypertext document that incorporates at least one of text, graphics, video, and audio, such as a webpage.

The system 100 may further include one or more web server(s) 130. The web server(s) 130 may be associated with a separate entity than the server system 102 (e.g., a third party) or may be associated with the same entity as server system 102. The one or more web servers 130 may include one or more application(s) 132 and one or more website(s) 136 (e.g., websites hosted by web servers 130). The one or more application(s) 132, executing on web server(s) 130, may interact with the server system 102, for example, via API server 120 via a programmatic interface provided by the API server 120. And the one or more websites 136 may interact with the server system 102, for example, via API server 120 via a programmatic interface provided by API server 120. For example, one or more of the applications 132 and/or websites 136 may request and utilize information from the server system 102 via the API server 120 to support one or more features or functions on a website hosted by the web server 130 or an application hosted by the web server 130. The website 136 or application 132, for example, may provide various functionality related to footprint recording and synchronizing that are supported by relevant functionality and data in the server system 102. The database(s) 134 may be storage devices that store information such as information associated with footprints, users, applications, websites, etc.

Figure 2:
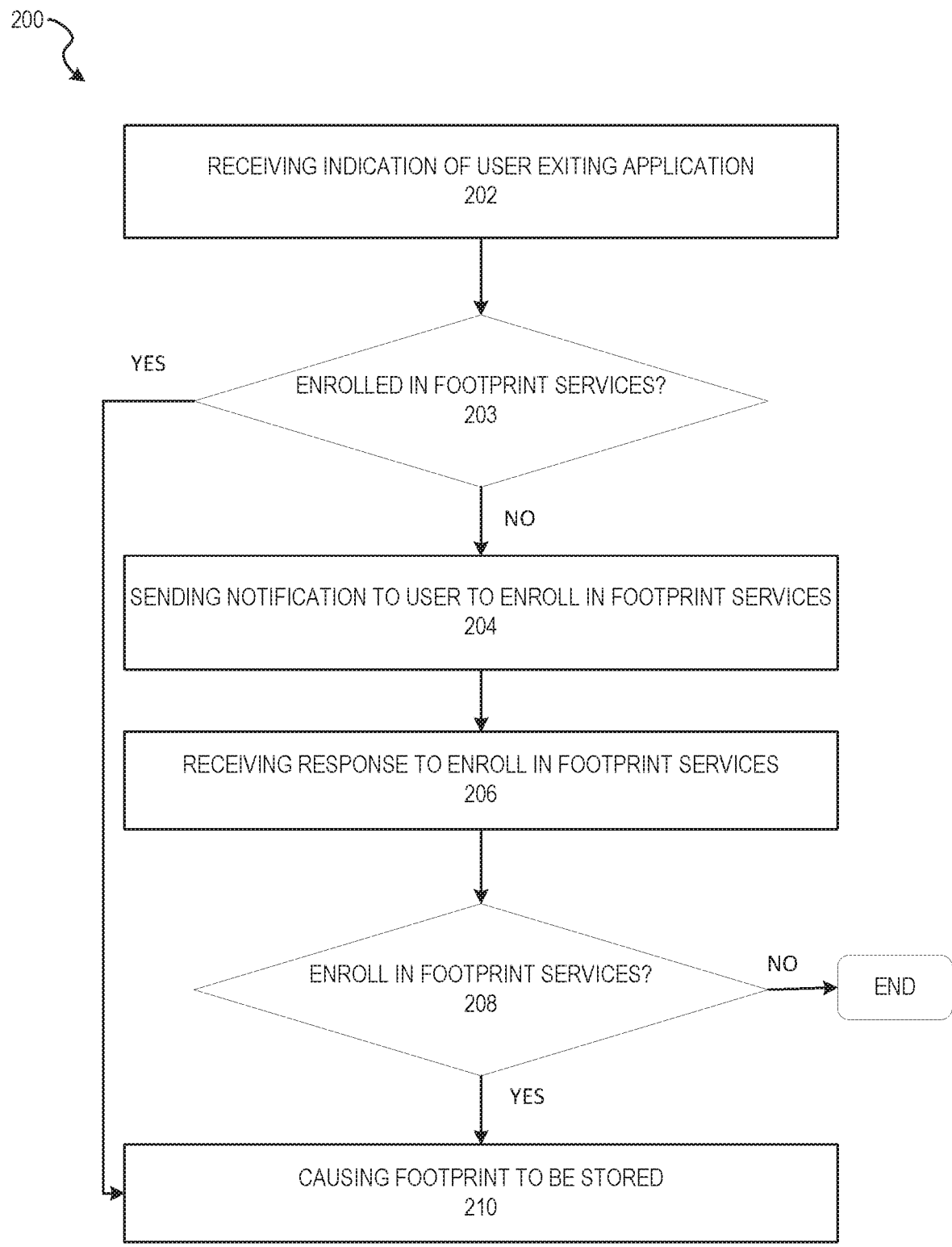
FIG. 2 is a flowchart illustrating aspects of a method, according to some example embodiments, for registering a user in footprint services and storing footprint information.

FIG. 2 is a flow chart illustrating aspects of a method 200, according to some example embodiments, for registering a user in footprint services and storing footprint information. For illustrative purposes, method 200 is described with respect to the networked system 100 of FIG. 1. It is to be understood that method 200 may be practiced with other system configurations in other embodiments.

As shown in operation 202, a server computer such as web server 130 may receive an indication from a client device 110 that a user is exiting an application (e.g., logging off of an application (e.g., a website) or closing an application (e.g., a web browser)) displaying a first document (e.g., a first webpage). For example, web server 130 may host one or more websites 136. A website hosted by web server 130 may be accessed by a user using a client device 110 and a client application 114 or web client 112 such as a web browser. The user may access any number of websites or webpages in any given session or time. After the user is finished accessing the current website and webpage (e.g., a first webpage), he may log off the website or close his web browser. For example, a user may log off the website by selecting an option (e.g., a link or menu item) to sign off or log off the website or may close his browser by selecting an option (e.g., a button or menu item in the browser) to close the browser. The web server 130 may receive an indication that the user has logged off or closed his browser from the browser itself, or from a plugin that is installed in the web browser or on the client device 110 that can detect when a user has logged off or has closed the browser and send a message to the web server 130 (as examples).

When the web server 130 receives an indication that the user has finished his browsing session, the web server 130 may determine whether the user is enrolled in footprint services to save a footprint of at least the last website visited by the user (see operation 203). For example, the web server 130 may determine that the user is enrolled in footprint services by looking up information associated with the user in one or more databases 134.

In another example, the web server 130 may determine that the user is enrolled in footprint services by sending a message to server system 102. In this example, the web server 130 may request user enrollment information from server system 102 via API server 120. The request for user enrollment information may include information such as information associated with the user (e.g., user identifier, user password, etc.), information associated with client device 110 (e.g., IP address, device identifier, etc.), and/or information associated with the website or webpage footprint (e.g., Uniform Resource Locator (URL), title of webpage, summary of webpage, etc.).

The server system 102 may then determine whether or not the user is enrolled in footprint services by looking up information associated with the user in one or more databases 126. The server system 102 may then return an indication of whether or not the user is enrolled in the footprint services. The server system 102 may also return footprint information or additional information about the user, one or more client devices 110, etc. If the user is enrolled in footprint services, the server system 102 may also store information associated with the user, client device 110, footprint, etc., in one or more databases 126.

If the web server 130 determines that the user is enrolled in footprint services, the web server 130 may cause the footprint information to be stored, as shown in operation

210. For example, the web server 130 may store the footprint information in one or more database(s) 134. The web server 130 may associate the footprint information with information associated with the user (e.g., user identifier, password, etc.). The web server 130 may also store information associated with the client device 110 (e.g., IP address, device identifier, hardware or software specifications, etc.).

In another example the server system 102 may store the footprint information in one or more database(s) 126. The server system 102 may associate the footprint information with information associated with the user (e.g., user identifier, password, IP address, device identifier, etc.). The server system 102 may also store information associated with the client device 110 (e.g., IP address, device identifier, hardware or software specifications, etc.). The server system 102 may store this information received from the web server 130 based on a determination that the user is enrolled in footprint services or may receive this information after the web server 130 determines that the user is enrolled in footprint services.

Figure 5:
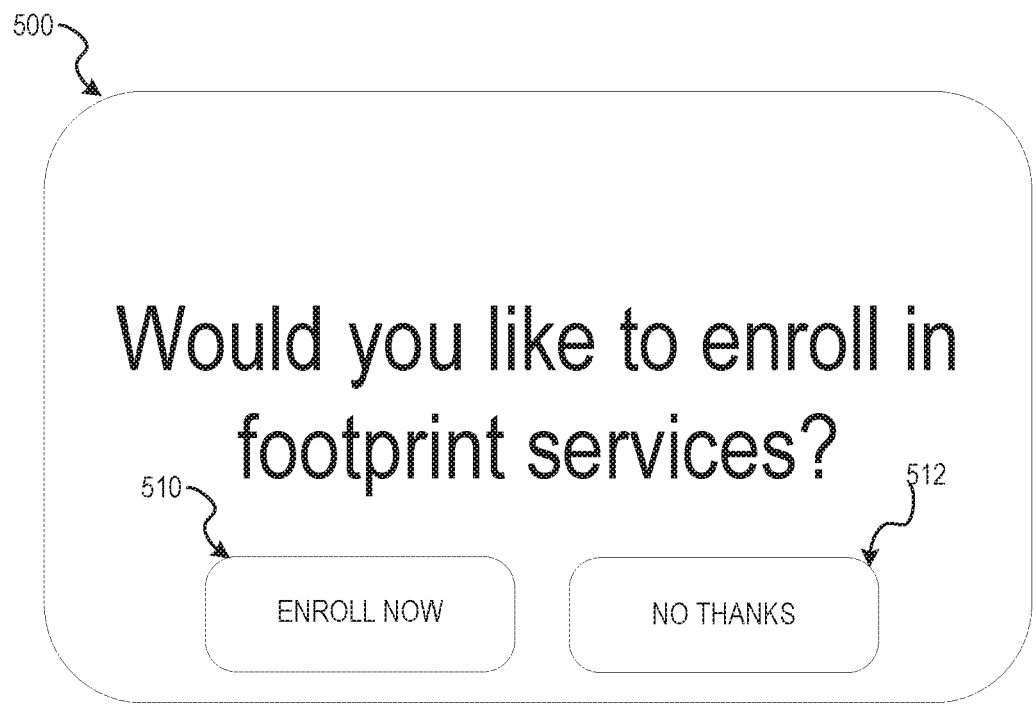
FIG. 5 is an exemplary display on a client device, according to some example embodiments.

If the web server 130 determines that the user is not enrolled in footprint services, the web server 130 may send a notification to the user (e.g., to the client device 110) to ask if the user would like to enroll in the footprint services (see operation 204). For example, the web server may cause a notification 500 to display on the client device 110 used by the user such as the one shown in FIG. 5. The user may respond to the request by providing an input to enroll or not to enroll. For example, the user can click or touch a button (e.g., 510, 512) on a display of a client device 110 as shown in FIG. 5 or by other means.

As shown in operation 206, the web server 130 may receive the response from the user (e.g., via a client device 110) and determine whether the user desired to enroll in the footprint services (see operation 208). If the response indicates that the user does not wish to enroll, the process ends. If the response indicates that the user would like to enroll in footprint services, the web server 130 may cause the footprint of the last website the user was viewing to be stored, as shown in operation 210 and described above. The web server 130 may request additional information from the user such as a user identifier, user password or PIN, etc. In the alternative, the web server 130 may automatically detect or determine this information without requiring the user to provide information. For example, the web server 130 may already have a user identifier (e.g., user name, email address, login name, phone number, address, etc.) and/or password PIN information stored in one or more databases 134. Or the web server 130 may be able to determine the user based on information obtained from the client device 110 such as an IP address, device identifier, information from cookies or similar technology, etc.

Figure 3:
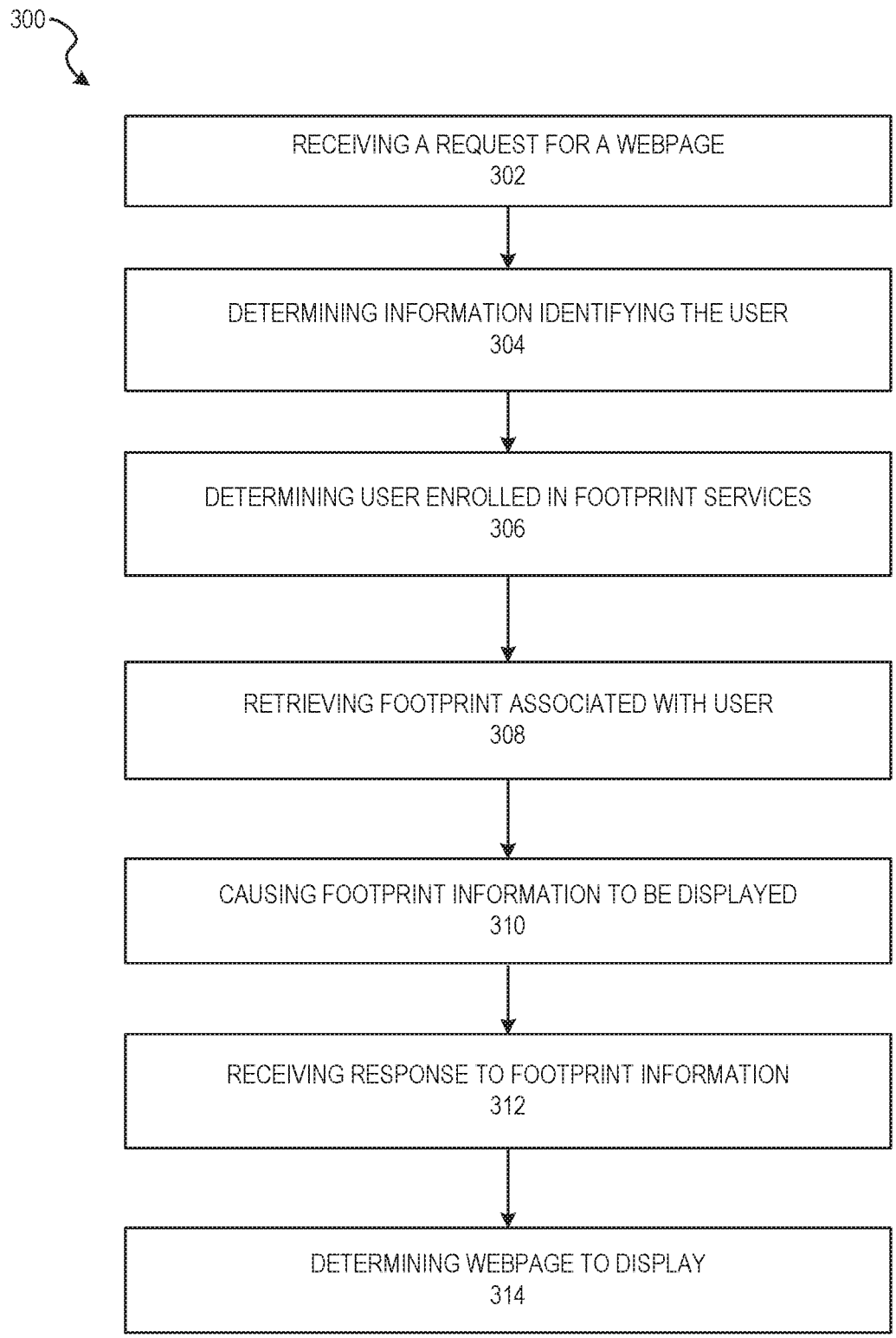
FIG. 3 is a flowchart illustrating aspects of a method, according to some example embodiments, for retrieving and utilizing footprint information.

FIG. 3 is a flow chart illustrating aspects of a method 300, according to some example embodiments, for retrieving and utilizing footprint information. For illustrative purposes, method 300 is described with respect to the networked system 100 of FIG. 1. It is to be understood that method 300 may be practiced with other system configurations in other embodiments.

As shown in operation 302, a server computer such as web server 130 may receive a request for a document such as a webpage from a client device 110. For example, a user may type in a URL into his web browser or other application, may click or press a link, icon, button, use voice, etc., to indicate a website, etc. This information may be sent by the client device 110 to the web server 130. Once the web server 130 receives the request for the webpage it may determine information identifying the user (see operation 304). The web server 130 may determine information associated with the user by requesting further information from the client device 110, from additional information received from the client device 110 in the request for the webpage, or from additional information from a user logging into the webpage with a user identifier and user password.

The web server 130 may determine whether the user is enrolled in footprint services, as explained above. As shown in operation 306, the web server 130 may determine that a user is enrolled in footprint services and, as shown in operation 308, retrieve footprint information associated with the user. For example, the web server 130 may retrieve footprint information associated with a user by looking up information associated with the user in one or more databases 134. In another example, the web server 130 may retrieve footprint information associated with the user by sending a message to server system 102. In this example, the web server 130 may request footprint information from server system 102 via API server 120. The request may include information such as information associated with the user (e.g., user identifier, user password, etc.), information associated with client device 110 (e.g., IP address, device identifier, etc.), and/or information associated with the website or webpage footprint (e.g., Uniform Resource Locator (URL), title of webpage, summary of webpage, etc.).

The server system 102 may then look up information associated with the user in one or more database to determine footprint information. The server system 102 may send the footprint information to the web server 130. Footprint information may include a URL, a title of a document, a summary of document, a form or format of a document, a bookmark of a document, or other information to identify a document such as a webpage. The web server 130 may receive the footprint information from the server system 102.

Figure 6:
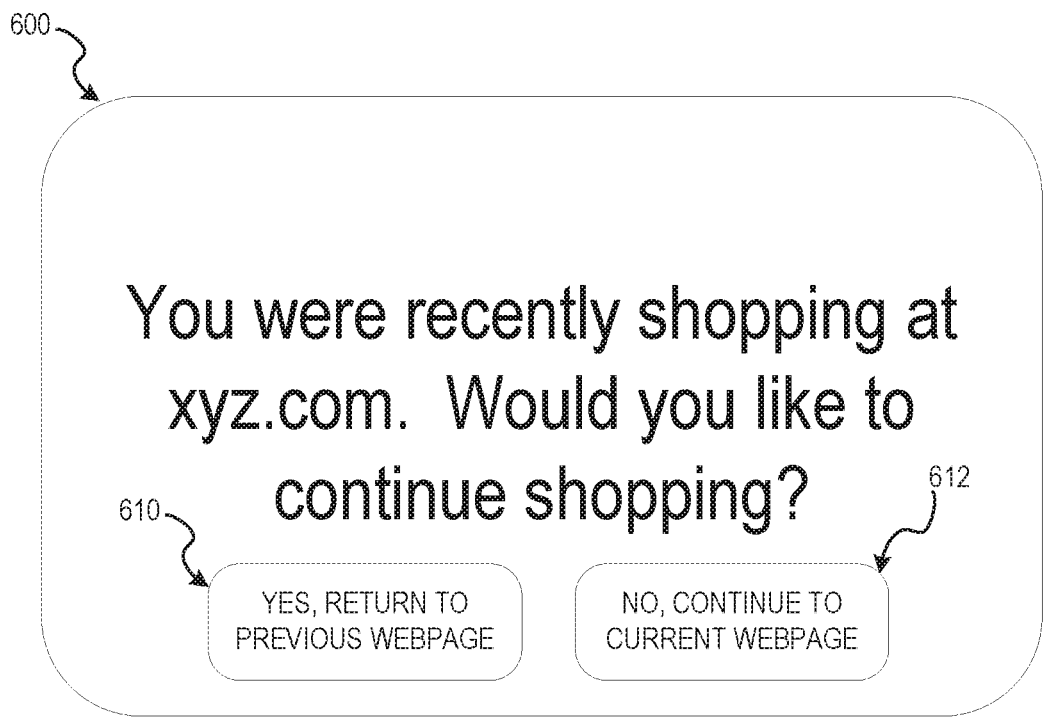
FIG. 6 is an exemplary display on a client device, according to some example embodiments.

As shown in operation 310, the web server 130 may cause the footprint information to be displayed to the user on the client device 110. For example, the user may be asked if he would like to return to the previous webpage that he was viewing (610) or continue to the current webpage (612) that he requested, as shown in FIG. 6. The information displayed to the user may include the URL and/or title from the previous web page, or a short summary description of the website. The information may also include the date and time the user last viewed the webpage and/or the client device the user was using (e.g., mobile phone, tablet, computer, etc.). For instance, the web server 130 may determine that the user was shopping for particular items (e.g., clothing, shoes, electronics, a particular product, etc.), reading a particular article or publication, looking up restaurant information, etc., and can customize the notification to ask if he would like to return to shopping for the particular item, reading about the particular subject or particular article, viewing restaurant information, etc. The user may respond to the footprint information by indicating that he would like to return to the previous webpage associated with the footprint information or go to the current web page that he has requested.

As shown in operation 312, the web server 130 may receive the user response to the footprint information from the client device 110 and, as shown in operation 314, the web server 130 may determine the webpage to display. For example, if the response to the footprint information indicates a user desire to continue to the current webpage, the web server 130 may cause the current webpage to display. If the response to the footprint information indicates a user desire to return to the webpage associated with the footprint, the web server 130 may cause the webpage associated with the footprint to display. The appropriate web page is then displayed on the client device 110.

Figure 4:
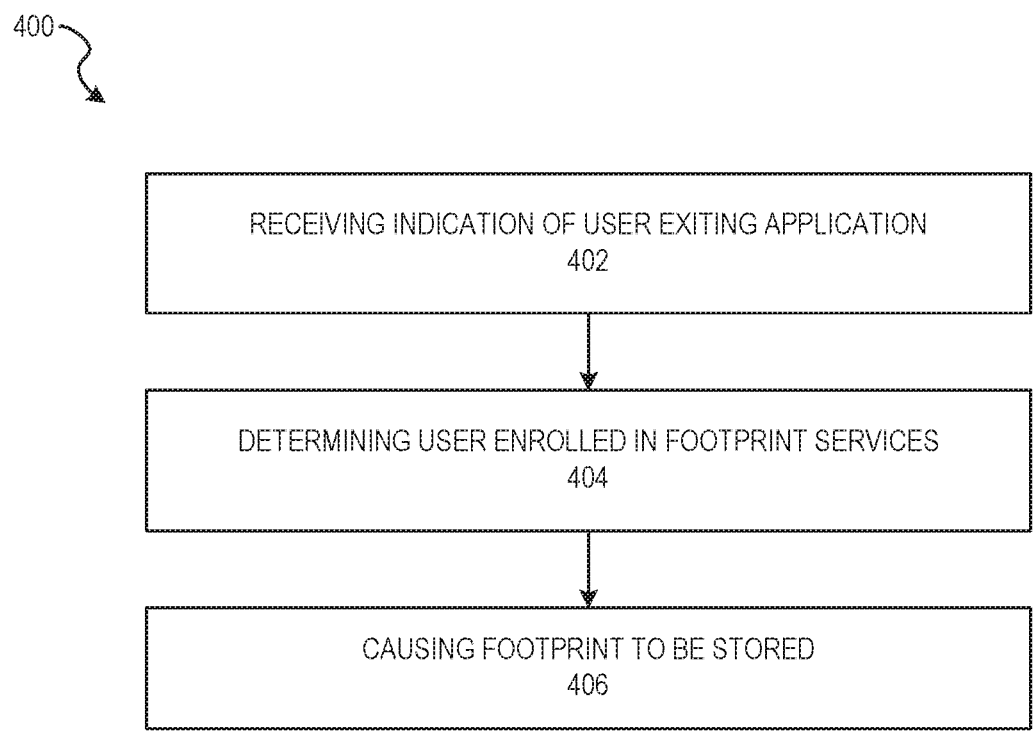
FIG. 4 is a flowchart illustrating aspects of a method, according to some example embodiments, for recording application footprints.

FIG. 4 is a flow chart illustrating aspects of a method 400, according to some example embodiments, for retrieving and utilizing footprint information. For illustrative purposes, method 400 is described with respect to the networked system 100 of FIG. 1. It is to be understood that method 400 may be practiced with other system configurations in other embodiments.

As shown in operation 402, a server computer such as web server 130 may receive an indication that a user is exiting an application (e.g., logging off of a website or closing a web browser displaying a first webpage), as explained in further detail above. The web server 130 may then determine whether a user is enrolled in footprint services (see operation 404), as also explained above.

As shown in operation 406, the web server 130 may determine that the user is enrolled in footprint services, and cause a footprint to be stored (as described above). The footprint may replace the existing footprint that is stored, or the footprint may be stored in addition to the existing footprint. A timestamp may also be stored with the footprint to indicate a date and/or time the webpage associated with the footprint was accessed.

Embodiments described herein allow for footprint access across platforms and devices. For example, a user may use different web browsers and applications. In one particular example, a user may be using a first web browser on a first client device 110 to view various websites and webpages. The last website or webpage viewed before the user logged off or closed his browser may be stored as a footprint in one or more databases 126 in server system 102. The user may then open a second web browser either on the first client device 110 or a second client device 110. The user information may be determined as explained above, and the user may be prompted to return to the webpage that he was viewing on the first web browser (either on the first or second device).

For example, user information may include information indicating that a user is associated with several different devices (e.g., mobile phone, tablet, personal computer) based on IP addresses or device identifiers, or other identifying information from these devices. In this way the user may be able to pick up the same website (e.g., finish shopping, reading an article, etc.) where he left off regardless of which web browser, application, or device he is using. Accordingly the footprint services may be used across platforms and devices. Moreover, the system may save the footprint for the document last viewed/accessed for each device associated with the user. Thus, the system allows for notification to the user to return to the last webpage from multiple devices. For example, a notification may be displayed on a client device 110 asking the user if he would like to return to shopping for electronics (e.g., from a last document viewed/accessed on his tablet), or finish reading a particular article (e.g., from a last document viewed/accessed on his mobile phone), etc. Then the user may choose which document to continue viewing on one of the same devices or a different device.

Embodiments described herein allow for recording an entire user's operation on a webpage or multiple webpages/ websites. For example, each time a footprint is stored in one or more databases 126 in server system 102, it can be associated with a timestamp. This can be used to reproduce the user's operations exactly as they occurred. This can help a user analyze their favorite or most utilized websites/ webpages or allow for investigation when there is a need to reproduce user behavior (e.g., technical issue with a web browser, application, client device, etc.).

Footprint information may allow for further analysis of the information. For example, footprint information may be analyzed to determine individual user behavior, many users' behaviors, and to sort and group users by interest in various websites/webpages.

In embodiments described herein, the web server(s) 130 and the server system 102 may exchange footprint and user information (including device information) as new information becomes available, or in batch at regular intervals (e.g., minutes, hours, days) to update their respective database(s) 134 and 126. Moreover, the web server(s) 130 and/or the server system 102 may only store the footprint of the last document (e.g., webpage) viewed or accessed by the user or may store an entire browsing session or a series of browsing sessions. In addition, the web server(s) 130 and/or the server system 102 may store the footprint for each document viewed or accessed by a user (e.g., each URL that the user accesses) as the user views/accesses the document (either to replace the last document or as a series of documents viewed/accessed).

Figure 7:
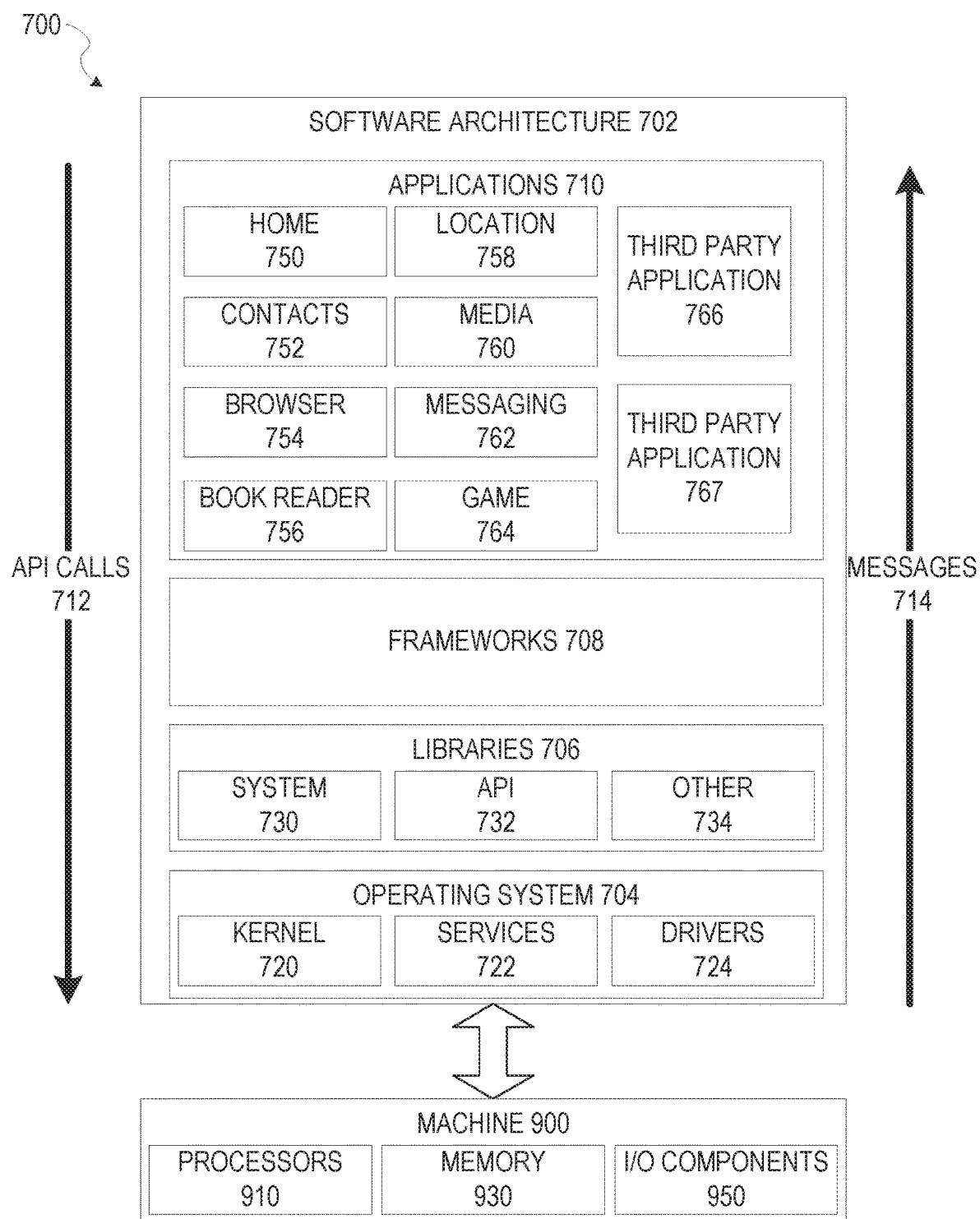
FIG. 7 is a block diagram illustrating an example of a software architecture that may be installed on a machine, according to some example embodiments, configured to record and synchronize browser footprints.

FIG. 7 is a block diagram 700 illustrating an architecture of software 702, which can be installed on any one or more of the devices described above. For example, in various embodiments, client devices 110 and server systems 130, 102, 120, and 122 may be implemented using some or all of the elements of software architecture 702. FIG. 7 is merely a non-limiting example of a software architecture, and it will be appreciated that many other architectures can be implemented to facilitate the functionality described herein. In various embodiments, the software architecture 702 is implemented by hardware such as machine 900 of FIG. 8 that includes processors 910, memory 930, and I/O components 950. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third party applications 766 and 767. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 766 can invoke the API calls 712 provided by the operating system 704 to facilitate functionality described herein.

Figure 8:
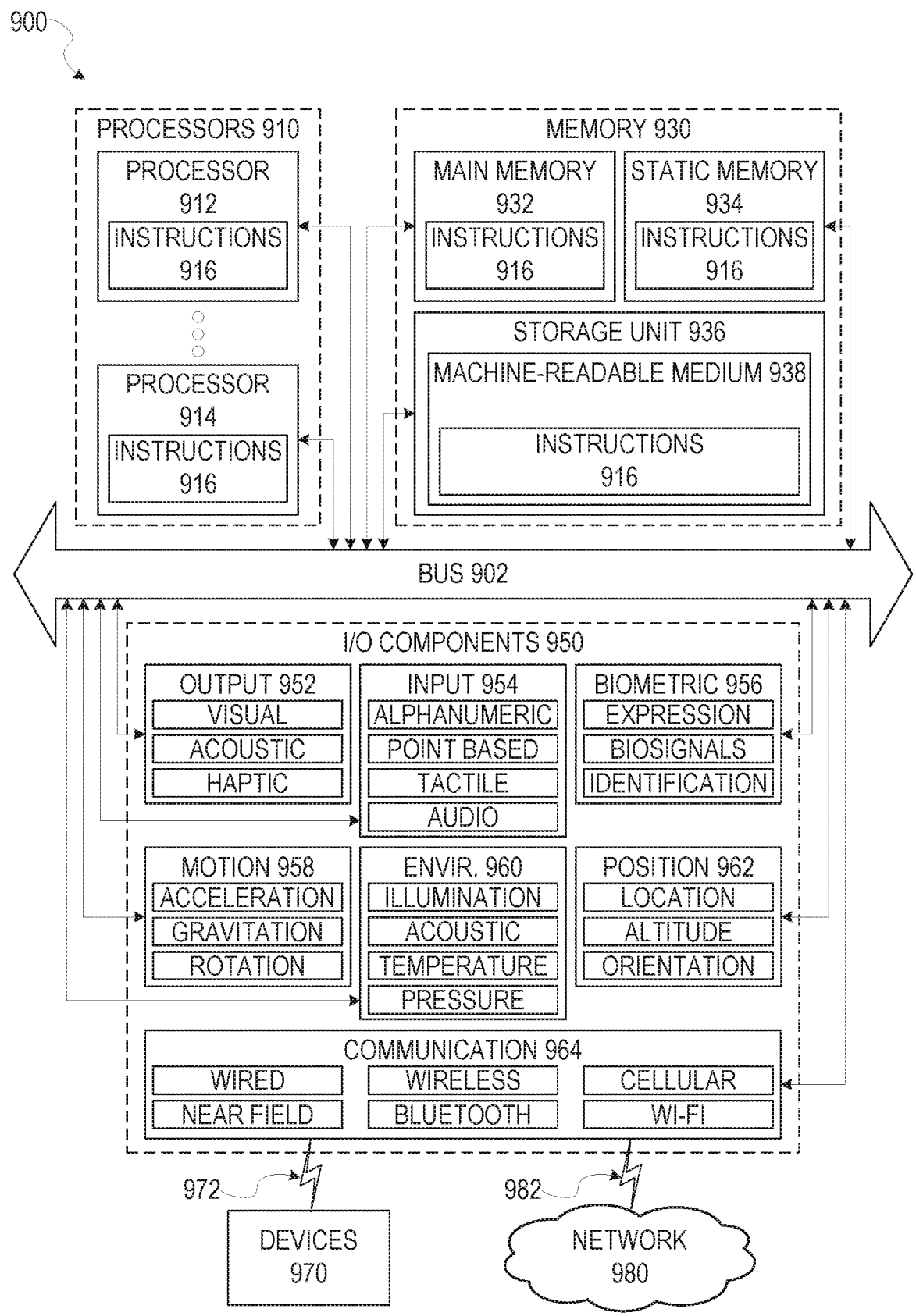
FIG. 8 illustrates a diagrammatic representation of a machine, in the form of a computer system, within which a set of instructions may be executed for causing the machine to perform any one or more of the methodologies discussed herein, according to an example embodiment.

FIG. 8 is a block diagram illustrating components of a machine 900, according to some embodiments, able to read instructions from a machine-readable medium (e.g., a machine-readable storage medium) and perform any one or more of the methodologies discussed herein. Specifically, FIG. 8 shows a diagrammatic representation of the machine 900 in the example form of a computer system, within which instructions 916 (e.g., software, a program, an application 710, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine 130, 102, 120, 122, etc., or a client device 110 in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute instructions 916 contemporaneously. Although FIG. 8 shows multiple processors 910, the machine 900 may include a single processor 910 with a single core, a single processor 910 with multiple cores (e.g., a multi-core processor 910), multiple processors 912, 914 with a single core, multiple processors 910, 912 with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in an example embodiment, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 8. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine 900 or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the medium 938 should be considered as being transportable from one physical location to another. Additionally, since the machine-readable medium 938 is tangible, the medium 938 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, at a server computer, an indication that a user is exiting an application displaying a first document associated with a first website;
   based on the indication that the user is exiting the application displaying the first document associated with the first website, replacing an existing footprint associated with the user and associated with a website different than the first website with a footprint of the first document in a database such that the existing footprint is no longer stored in the database, the footprint of the first document comprising information to identify and summarize the first document and information associated with the user;
   receiving, at the server computer, a request for a second document associated with a second website different from the first website, from a client device operated by the user;
   retrieving a footprint associated with the user including information related to the first document previously accessed by the user;
   causing footprint information comprising a summary description of the first document based on the stored information to identify and summarize the first document, to be displayed on the client device;
   receiving, from the client device, a response to the footprint information displayed on the client device indicating a request to display the first document associated with the footprint and the first website instead of displaying the second document requested by the user and associated with the second web site different from the first website; and
   causing the first document associated with the footprint and the first website to be displayed on the client device instead of the second document requested by the user and associated with the second website different from the first website.

2. The method of claim 1, further comprising:
   receiving, from the client device, and indication that the user is exiting a second application displaying a third document associated with a third website; and
   upon receiving the indication that the user is exiting the second application displaying the third document associated with the third website, replacing the footprint of the first document with a footprint of the third document in the database such that the footprint of the first document is no longer stored in the database, the footprint of the third document comprising information to identify and summarize the third document and information associated with the user.

3. The method of claim 2, further comprising:
storing the footprint of the third document and a timestamp for the third document in addition to the footprint of the first document and a timestamp for the first document; and
reproducing user operations as they occurred based on the stored footprint of the first document and the stored footprint of the third document.

4. The method of claim 2, wherein the first document and the third document are each a hypertext document that incorporates at least one of text, graphics, video, and audio.

5. The method of claim 1, wherein the application is a first application and the request for a second document from the client device is received via a second application on the client device.

6. The method of claim 1, wherein before storing the footprint of the first document the method comprises:
identifying the user;
determining that the user is not enrolled in footprint services;
sending a notification with an option to enroll in the footprint services;
receiving a response from the client device to enroll the user in the footprint services; and
enrolling the user in the footprint services.

7. The method of claim 6, wherein the response to enroll the user in the footprint services includes a user identifier and wherein the first document is stored and associated with the user identifier.

8. The method of claim 1, wherein before retrieving the footprint associated with the user, the method comprises:
determining that the user is enrolled in footprint services by matching information corresponding to the user with enrollment information stored in a database comprising information identifying the user.

9. The method of claim 8, wherein the information identifying the user includes at least one of a user identifier, an IP address, a user password, a user PIN, and a device identifier.

10. The method of claim 1, wherein before retrieving the footprint associated with the user, the method comprises:
determining that the user is enrolled in a footprint services based on a device identifier of the client device by:
obtaining the device identifier from the client device; and
accessing one or more databases to determine that the device identifier of the client device is associated with a user enrolled in the footprint services.

11. A server computer comprising:
a memory that stores instructions; and
one or more processors configured by the instructions to perform operations comprising:
receiving an indication that a user is exiting an application displaying a first document associated with a first website;
based on the indication that the user is exiting the application displaying the first document associated with the first website, replacing an existing footprint associated with the user and associated with a website different than the first website with a footprint of the first document in a database such that the existing footprint is no longer stored in the database, the footprint of the first document comprising information to identify and summarize the first document and information associated with the user;
receiving a request for a second document associated with a second web site different from the first website, from a client device operated by the user;
retrieving a footprint associated with the user including information related to the first document previously accessed by the user;
causing footprint information comprising a summary description of the first document based on the stored information to identify and summarize the first document, to be displayed on the client device;
receiving a response to the footprint information displayed on the client device indicating a request to display the first document associated with the footprint and the first website instead of displaying the second document requested by the user and associated with the second website different from the first website; and
causing the first document associated with the footprint and the first website to be displayed on the client device instead of the second document requested by the user and associated with the second website different from the first website.

12. The server computer of claim 11, further comprising:
receiving, from the client device, and indication that the user is exiting a second application displaying a third document associated with a third website; and
upon receiving the indication that the user is exiting the second application displaying the third document associated with the third website, replacing the footprint of the first document with a footprint of the third document in the database such that the footprint of the first document is no longer stored in the database, the footprint of the third document comprising information to identify and summarize the third document and information associated with the user.

13. The server computer of claim 12, further comprising:
storing the footprint of the third document and a timestamp for the third document in addition to the footprint of the first document and a timestamp for the first document; and
reproducing user operations as they occurred based on the stored footprint of the first document and the stored footprint of the third document.

14. The server computer of claim 11, wherein the application is a first application and the request for a second document from the client device is received via a second application on the client device.

15. The server computer of claim 11, wherein before storing the footprint of the first document the method comprises:
identifying the user;
determining that the user is not enrolled in footprint services;
sending a notification with an option to enroll in the footprint services;
receiving a response from the client device to enroll the user in the footprint services; and
enrolling the user in the footprint services.

16. The server computer of claim 15, wherein the response to enroll the user in the footprint services includes a user identifier and wherein the first document is stored and associated with the user identifier.

17. The server computer of claim 11, wherein before retrieving the footprint associated with the user, the method comprises:
determining that the user is enrolled in footprint services by matching information corresponding to the user with enrollment information stored in a database comprising information identifying the user.

18. The server computer of claim 17, wherein the information identifying the user includes at least one of a user identifier, an IP address, a user password, a user PIN, and a device identifier.

19. The server computer of claim 11, wherein before retrieving the footprint associated with the user, the method comprises:
- determining that the user is enrolled in a footprint services based on a device identifier of the client device by:
- obtaining the device identifier from the client device; and
- accessing one or more databases to determine that the device identifier of the client device is associated with a user enrolled in the footprint services.

20. A non-transitory computer readable medium comprising instructions stored thereon that are executable by at least one processor to cause a computing device to perform operations comprising:
- receiving an indication that a user is exiting an application displaying a first document associated with a first website;
- based on the indication that the user is exiting the application displaying the first document associated with the first website, replacing an existing footprint associated with the user and associated with a website different than the first website with a footprint of the first document in a database such that the existing footprint is no longer stored in the database, the footprint of the first document comprising information to identify and summarize the first document and information associated with the user;
- receiving a request for a second document associated with a second web site different from the first website, from a client device operated by the user;
- retrieving a footprint associated with the user including information related to the first document previously accessed by the user;
- causing footprint information comprising a summary description of the first document based on the stored information to identify and summarize the first document, to be displayed on the client device;
- receiving a response to the footprint information displayed on the client device indicating a request to display the first document associated with the footprint and the first website instead of displaying the second document requested by the user and associated with the second website different from the first website; and
- causing the first document associated with the footprint and the first website to be displayed on the client device instead of the second document requested by the user and associated with the second website different from the first website.

* * * * *